United States Patent [19]
Chandler

[11] Patent Number: 5,390,985
[45] Date of Patent: Feb. 21, 1995

[54] NON-PNEUMATIC, GROUND-ENGAGING CUSHIONING MEANS WITH RAISED TREADS FOR TIRES OR ENDLESS TRACKS

[75] Inventor: Graeme A. Chandler, Morley, Australia

[73] Assignee: AirBoss Limited, West Pert, Australia

[21] Appl. No.: 949,545

[22] PCT Filed: May 10, 1991

[86] PCT No.: PCT/AU91/00201
§ 371 Date: Nov. 13, 1992
§ 102(e) Date: Nov. 13, 1992

[87] PCT Pub. No.: WO91/17899
PCT Pub. Date: Nov. 28, 1991

[30] Foreign Application Priority Data
May 14, 1990 [AU] Australia ............... PK0107

[51] Int. Cl.⁶ .............. B60B 15/00; B60C 7/05
[52] U.S. Cl. .................... 301/44.2; 301/43; 152/308; 152/324
[58] Field of Search .......... 152/178, 185.1, 190, 152/300, 305, 306, 308, 309, 323, 324, 325, 326; 301/41.1, 43, 44.1, 44.2, 44.3; D12/136, 146, 147, 148, 149, 151

[56] References Cited

U.S. PATENT DOCUMENTS

| | | | |
|---|---|---|---|
| D. 56,911 | 1/1921 | Crow | D12/147 |
| D. 106,079 | 9/1937 | Youngloe | D12/147 |
| D. 329,413 | 9/1992 | Chandler | D12/151 |
| 969,889 | 9/1910 | Lighthouse | 152/308 X |
| 1,062,335 | 5/1913 | Husted | 301/44.1 |
| 1,455,844 | 5/1923 | Lang . | |
| 1,494,797 | 5/1924 | Nimschke | 152/305 X |
| 1,658,623 | 2/1928 | Wittkopp . | |
| 5,078,454 | 1/1992 | Rollinson | 305/54 X |
| 5,154,490 | 10/1992 | Burns | 301/43 X |

FOREIGN PATENT DOCUMENTS

| | | |
|---|---|---|
| 29891/63 | 10/1964 | Australia . |
| 87120 | 5/1983 | Australia . |
| 39602/89 | 2/1990 | Australia . |
| 453544 | 9/1936 | United Kingdom . |
| 857439 | 12/1960 | United Kingdom . |
| 9000983 | 2/1990 | WIPO ................ 152/5 |

OTHER PUBLICATIONS

Derwent Abstrat Accession No. 88-131375/19 Class Q11 SU 1342-748-A, 1342748 (Large Tyres Res Ins) Oct. 7, 1987.

Primary Examiner—Russell D. Stormer
Attorney, Agent, or Firm—Handal & Morofsky

[57] ABSTRACT

A tire comprising a body constructed to deform resiliently under load and a tread provided on the body. The tread comprising a plurality of raised portions (29) disposed in circumferential relationship and defining grooves (49) therebetween. Each raised portion (25) comprising a first central section (27) and a pair of lateral sections (29) each extending outwardly from the central section towards one side of the body. The lateral sections (29) define a V formation and the first central section (27) extends from the V formation in a direction away from the outer ends of the lateral sections (29) and towards the V formation if the next adjacent raised portion. The body may be defined by a plurality of segments (11) individually mountable onto a base.

21 Claims, 6 Drawing Sheets

NON-PNEUMATIC, GROUND-ENGAGING CUSHIONING MEANS WITH RAISED TREADS FOR TIRES OR ENDLESS TRACKS

FIELD OF THE INVENTION

This invention relates to a ground engaging means for vehicles and is particularly suitable as a tire or endless track for work vehicles of the skid-steer type.

BACKGROUND OF THE INVENTION

A skid-steer vehicle is self-propelled vehicle which has drive wheels or tracks on two opposed sides of the vehicle and which achieves a steering function by controlled rotation of one of the opposed drive wheels or tracks relative to the other. Relative rotation between the opposed drive wheels or tracks results in a change in direction of the vehicle and so provides a steering function. With such vehicles it is important that the drive wheels or tracks each have a tread formation that provides good traction with the ground and good directional control both in straight-line travel and in turning.

SUMMARY OF THE INVENTION

The present invention seeks to provide a ground engaging means having a tread formation which provides good traction with the ground and good directional control.

In one form the invention resides in a ground engaging means comprising a body constructed to deform resiliently under load and a tread provided on the body, the tread comprising a plurality of raised portions disposed in circumferential relationship and defining grooves therebetween, each raised portion comprising a first central section and a pair of lateral sections each extending outwardly from the central section towards one side of the body, the lateral sections defining a V formation and the first central section extending from the V formation in a direction away from the outer ends of the lateral sections and towards the V formation of the next adjacent raised portion.

Preferably, the end of each first central section remote from the lateral sections converges to a point.

The first central section of each raised portion may include a pair of generally parallel edges and a pair of converging edges which define said point. For preference, each of the converging edges is generally parallel with a respective one of the lateral sections.

Each raised portion may also include a second central section extending from the V formation in a direction opposite to the first central section.

The end of each second central section remote from the lateral sections may define a tail formation having a recess.

The outer ends of each pair of lateral sections preferably each terminate adjacent the respective side of the body.

In one arrangement, the body is annular such that the ground engaging means is in the form of a tire. For preference, the annular body is of one-piece construction. In such a case, the first and second central sections may co-operate to form a central rib which extends around the body.

In another arrangement, the body is defined by a plurality of segments individually mountable onto a base. Where the ground engaging means is for a wheel, the base may be of any suitable form such as the rim of the wheel or a band adapted to be permanently or removably fitted onto the rim. Where the ground engaging means is for an endless track, the base may comprise a flexible endless band passing around end rollers of the track.

Preferably, each segment is configured in a V formation. For preference the V formation defined by the segment generally corresponds to the V formation defined by the lateral sections of the raised portion of the tread.

Each segment is preferably hollow. Conveniently, the segment is tubular and is open at its ends.

In another form the invention resides in a ground engaging segment comprising a hollow elongated body having an inner longitudinal face, an outer longitudinal face and longitudinal side faces extending between the inner and outer faces, a raised portion provided on the outer face, at least part of said raised portion being spaced inwardly of the longitudinal side faces, said raised portion comprising central section and a pair of lateral sections each extending outwardly from the first central section towards the ends of the body, the lateral sections defining a V formation and the first central section extending from the V formation in the direction away from the outer ends of the lateral sections and towards the adjacent longitudinal side face of the body.

The end of the first central section remote from the lateral sections preferably converges to a point. The point defined by the central section may include a pair of converging edges which are generally co-planar with the corresponding longitudinal side face of the body.

Each raised portion may include a second central section extending from the V formation in a direction opposite to the first central section.

The end of each second central section remote from the lateral sections may define a tail formation having a recess. The tail formation may include a pair of diverging edges which are generally co-planar with the corresponding longitudinal side face of the body.

BRIEF DESCRIPTION OF THE DRAWINGS

The invention will be better understood by reference to the following description of several specific embodiment thereof as shown in the accompanying drawings in which.

DESCRIPTION OF THE PREFERRED EMBODIMENTS

The embodiments shown in the drawings are directed to tires for use on vehicles of the skid-steer type.

Figure 1:
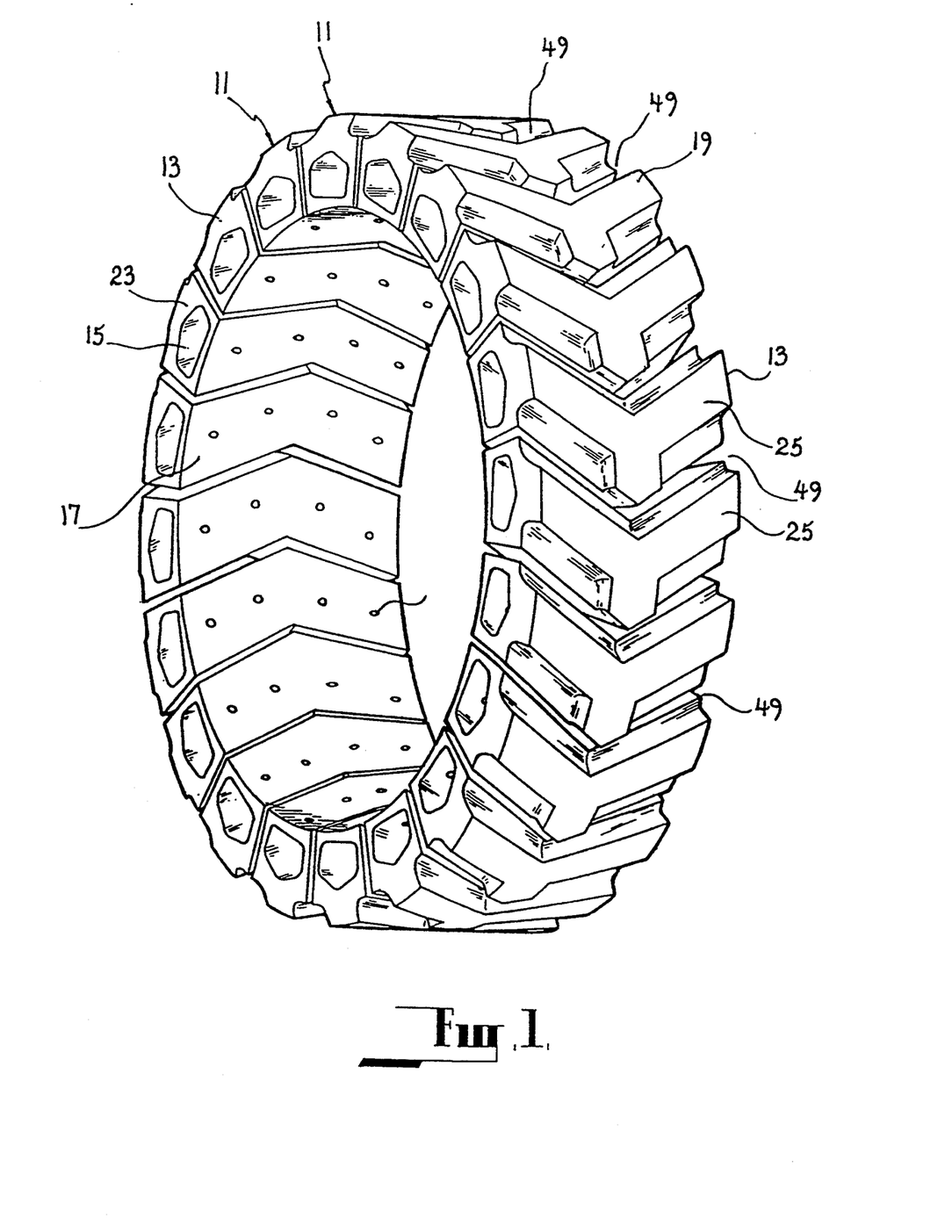
FIG. 1 is a perspective view of a tire constructed in accordance with a first embodiment.
Figure 2:
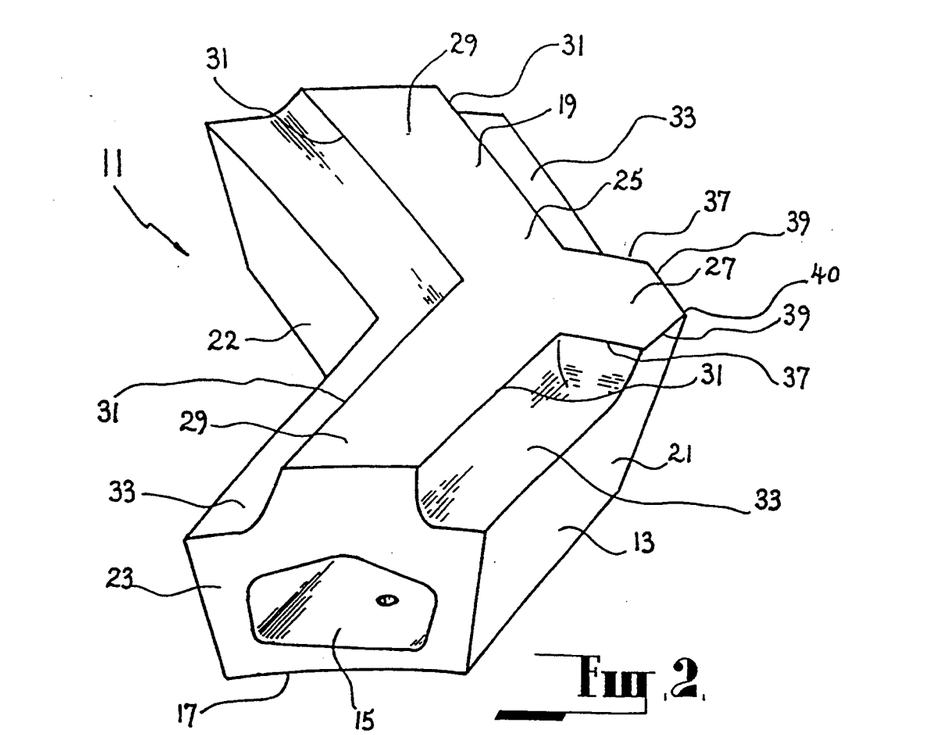
FIG. 2 is a perspective view of a segment which forms part of the tire of FIG. 1.
Figure 3:
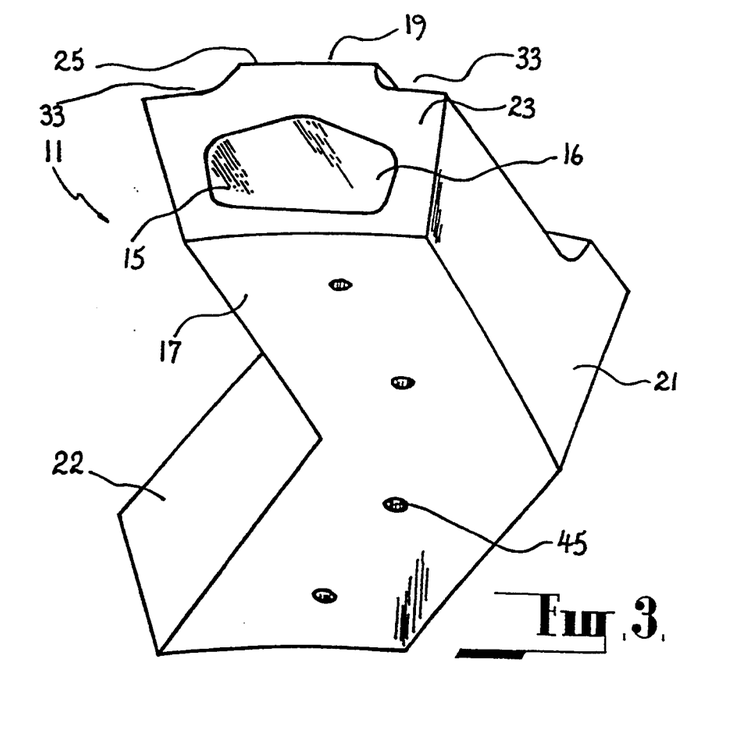
FIG. 3 is a perspective view from the underside of the segment of FIG. 2.

The embodiment shown in FIGS. 1 to 3 of the drawings is in the form of a tire comprising a plurality of ground engaging segments 11 adapted to be individually mounted on the periphery of a wheel rim (not shown) to form a wheel.

Each segment extends transversely of the direction of travel of the wheel and is configured into a V formation, as shown in the drawings.

Each segment 11 comprises a hollow body 13 formed from reinforced, resilient polymeric material such as rubber. The body is tubular and open at its ends to define apertures 15 which provide access to the interior of the hollow body for air or mounting means. A ventilation cavity 16 extends between apertures 15.

The hollow body of each ground engaging segment comprises an inner longitudinal face 17 for engagement against the rim, an outer longitudinal face 19 for contacting the ground and two longitudinal side faces 21, 22 extending between the inner and outer faces. The longitudinal body further includes end faces 23 in which the apertures 15 are provided.

It has been found that the relationship between the height of the segment (defined as the distance between the inner longitudinal face 17 and the outer longitudinal face 19) and the width of the segment (defined as the distance between the longitudinal faces 21 and 22) influences the load carrying and torque transfer capabilities of the tire. Although any suitable ratio of height to width may be utilized, it has been found that ratios in the range 0.75 to 1.1 (height:width) exhibit desirable load carrying and torque transfer characteristics.

The outer longitudinal face 19 is provided with a raised ground-contacting portion which includes a first central section 27 and two lateral sections 29, all of which are formed integrally with each other. The lateral sections 29 extend outwardly from one end of the central section towards respective end faces 23 and define a V formation which corresponds to the V formation defined by the segment. Each lateral section 29 has longitudinal edges 31 spaced inwardly from the longitudinal side faces 21, 22 of the body so as to define rebates 33 in the body.

As can be seen in FIGS. 2 and 3, raised ground-contacting portion 25 overlies a raised central portion of apertures 15. As is also apparent from the tubular nature of the segment bodies 13, cavities 16 also have a raised central portion.

The central section 27 extends from the base of the V formation defined by the lateral sections 29 to the adjacent longitudinal face 21 of the hollow body, as shown in the drawings. The central section 27 includes a pair of parallel side edges 37 and a pair of converging edges 39 which define a point 40. The converging edges 39 are co-planar with the longitudinal side 21 of the hollow body.

The segments are mounted circumferentially on the rim with neighboring longitudinal faces confronting one another. The segments are secured to the rim by means of a clamping plate (not shown) located within the cavity 16 in each segment. The clamping plate is secured to the rim by way of fixing bolts which extend through apertures in the clamping plate and corresponding apertures 45 formed in the inner longitudinal face 17 of the segment. The clamping plate has longitudinal sides which are upturned in a curved formation so as to provide some lateral support for the longitudinal side faces of the hollow body and also to avoid presenting a sharp edge which might damage the hollow body.

Thus mounted, on a rim or base, the segments cooperate to provide a tire body which is resiliently deformable under load. As the segments deform, raised tread portion 25 moves radially inwardly, so that ground-engaging loads are directed laterally of the ventilation cavity 16 to confronting longitudinal faces 21, 22 which can pass these loads to neighboring elements.

With the segments mounted circumferentially on the rim, the raised portions 25 are in circumferentially spaced relationship and grooves 49 are defined by co-operation between the neighboring rebates 33 of adjacent segments.

Figure 4:
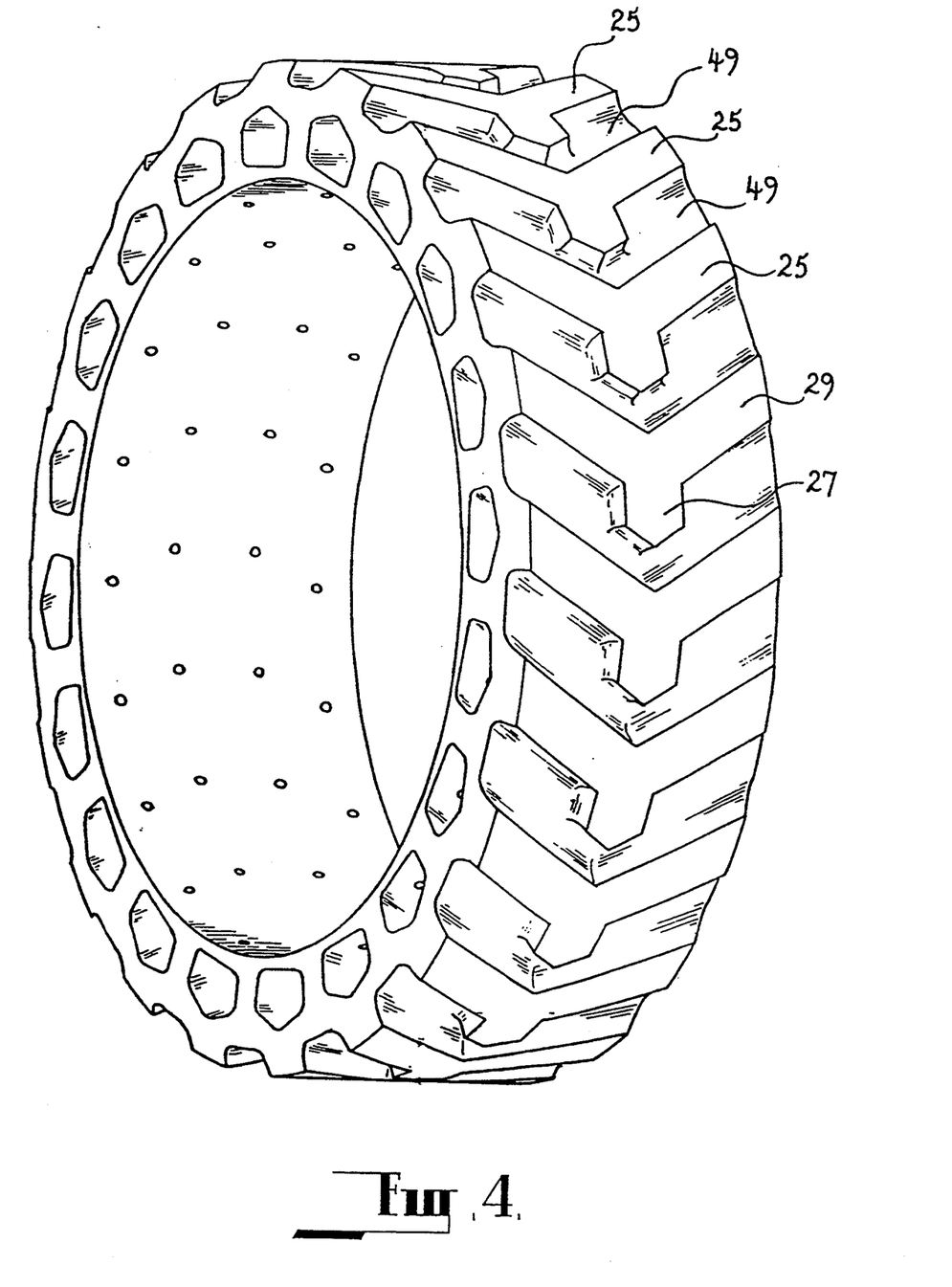
FIG. 4 is a perspective view of a tire according to a second embodiment.

Referring now to FIG. 4 of the drawings, tire according to the second embodiment is similar to the first embodiment with the exception that it is of one-piece construction rather than being formed from a plurality of segments which are assembled onto a wheel rim. In this embodiment, the tire is in the form of an annular body which can be fitted onto a wheel rim and retained in such position by way of clamping plates as was the case in the first embodiment or any other suitable way such as by bonding.

In a similar fashion to the first embodiment, it has been found that the "height to width" ration of this one-piece construction plays an important role in determining the load carrying and torque transfer characteristics of the tire. In this case however the "width" would be defined as the annular inner face circumference of the tire divided by the number of cavities (effectively giving the equivalent segment width as in the first embodiment).

As was noted in the first embodiment, it has been found that ratios in the range of 0.75 to 1.1 (height:width) exhibit the most desirable load carrying and torque transfer characteristics, although any desirable ratio may actually be used.

Figure 5:
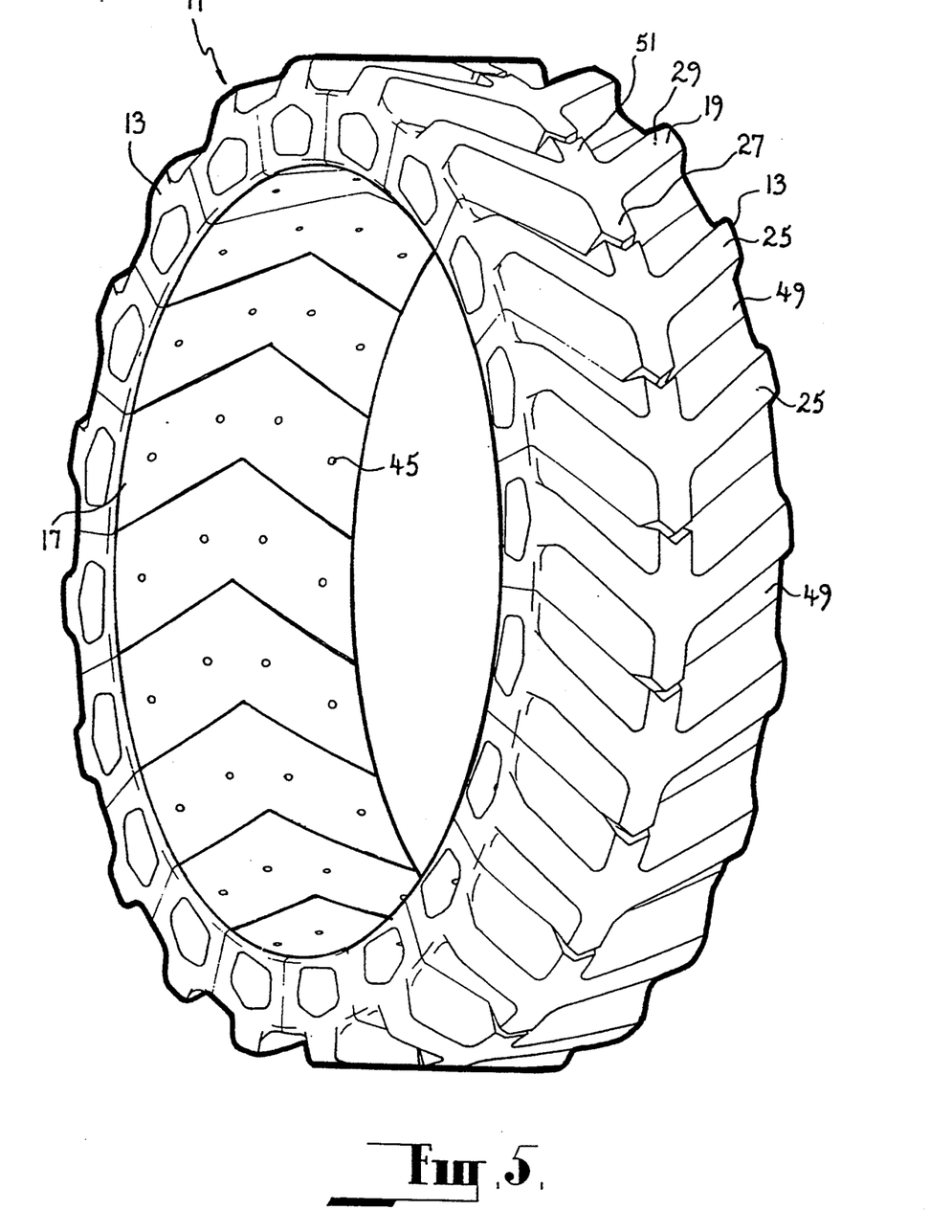
FIG. 5 is a perspective view of a tire constructed in accordance with a third embodiment.
Figure 6:
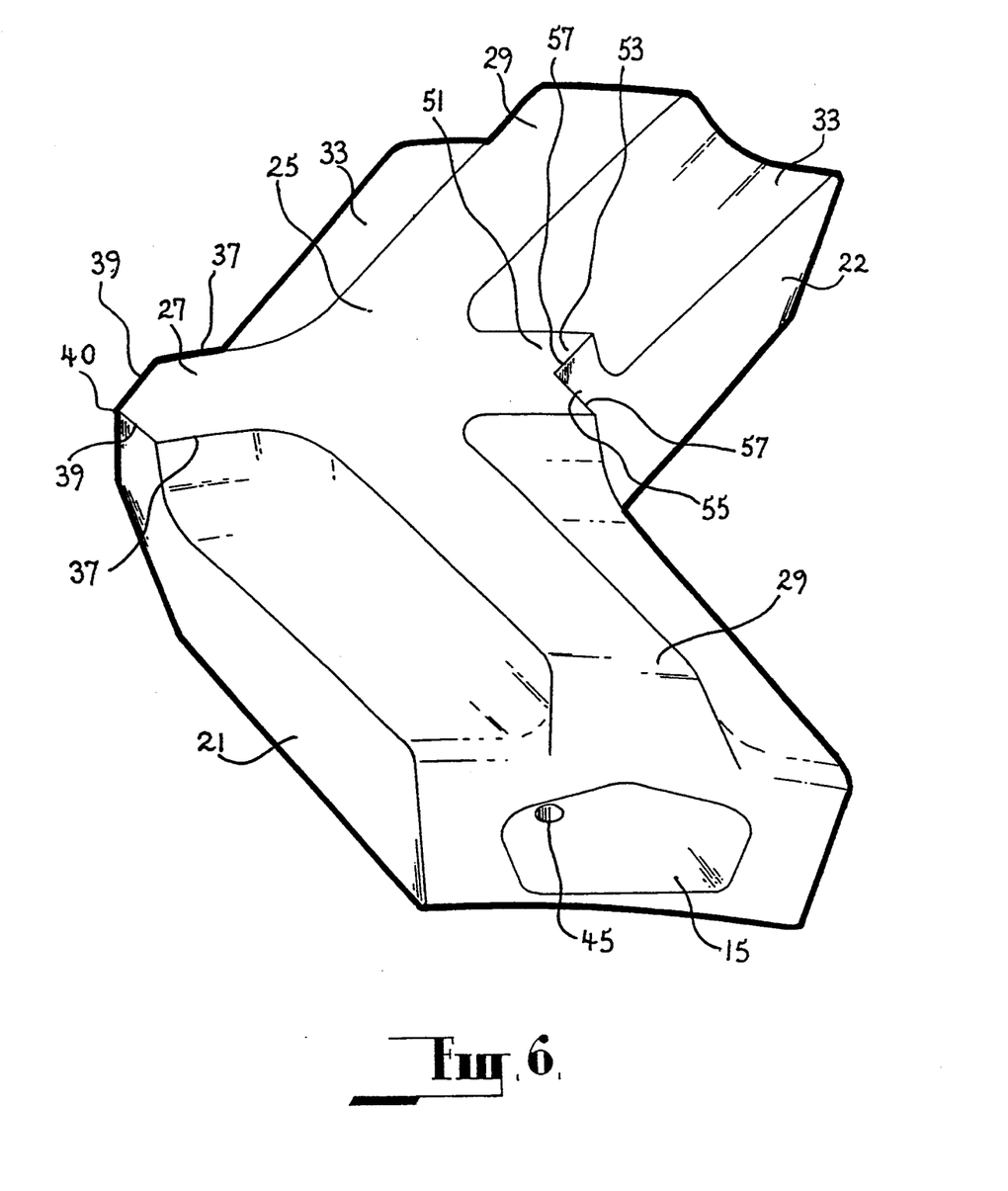
FIG. 6 is a perspective view of a segment which forms part of the tire of FIG. 5
Figure 7:
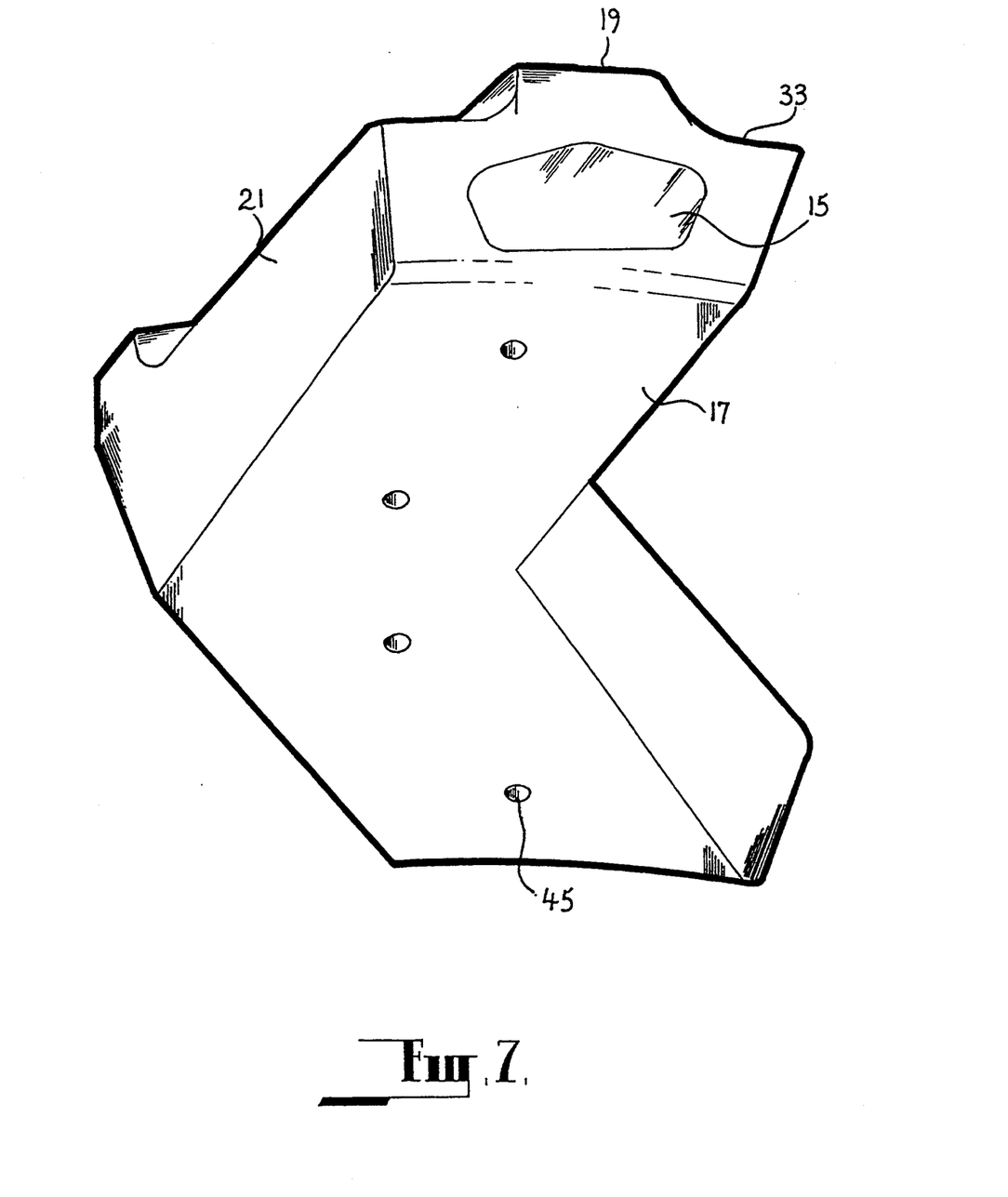
FIG. 7 is a perspective view from the underside of the segment of FIG. 6.

The third embodiment, which is shown in FIGS. 5, 6 and 7 is similar to the first embodiment, which the exception that each raised portion 25 further includes a second central section 51 which extends from the base of the V formation defined by the two lateral sections 29 in the opposite direction to the first central section 27. The free end of the second central section (being the end remote from the lateral sections 29) defines a tail formation 53 having a recess 55. The tail formation 53 has a pair of diverging edges 57 which define the recess 55 and which are co-planar with the longitudinal side 22 of the body. The recess 55 generally conforms with, and receives, the point 40 of a neighboring segment, as shown in FIG. 5.

The first and second central sections 27 and 51 co-operate to form a central circumferential rib on the tire which is conducive to smooth ride conditions on paved and other hard surfaces.

The various embodiments each provide a tire which is of relatively simple construction but which is highly effective in operation on a skid-steer vehicle. The tread of the tire provides for good traction with the ground and directional control both in straight-line travel and turning. The tire has further benefits in that it is resilient so as to provide cushioning and that it is non-pneumatic thereby avoiding problems with puncturing.

In summary, the invention provides, in one aspect a hollow, resilient, integral, ground-engaging, cushioning segment for a wheel or endless track for a vehicle, said wheel or endless track having a band-shaped base cyclically movable around at least one axis, multiple said cushioning segments being mountable in a side-by-side, closely interfitting disposition around said base to provide a continuous ground-engaging support cushion for said vehicle, individual said cushioning segments being elongated, tubular and open-ended to define at least one longitudinally extending aperture providing interior access to said hollow segment, said cushioning segments extending across said band-shaped base between segment ends at opposed sides of said band, when mounted on said base, and each comprising:

a) a longitudinal inner portion for engagement with said base;

b) a longitudinal outer segment portion carrying a ground-engaging surface;

c) longitudinal side faces extending between said inner and outer faces and providing resilient support for said outer segment portion;

d) a longitudinally extending raised tread carrying said ground-engaging surface, said raised tread being located on said outer segment portion between and spaced from said hollow segment; and e) said at least one longitudinally extending ventilation aperture, said aperture being defined between said inner, outer and side portions and opening to atmosphere at each said segment end to cool said ground-engaging segment;

wherein said ventilation aperture has a cross-sectional shape including a raised portion extending beneath said raised tread along said tread whereby, under ground-engaging loads, said tread-bearing portion is movable inwardly toward said inner portion and said ground-engaging loads are directed laterally of said side walls toward neighboring segments and wherein said cushioning segments are configured to be inter-fittable around said at least one axis, with said segment, said tread and said ventilation aperture being shaped to extend laterally toward a neighboring segment, when mounted, said shaping being symmetrical about a midpoint of each segment's length.

It should be appreciated that the scope of the invention is not limited to the scope of the embodiments described.

I claim:

1. A hollow, resilient, integral, ground-engaging, cushioning segment for a wheel or endless track for a vehicle, said wheel or endless track having a band-shaped base cyclically movable around at least one axis, multiple said cushioning segments being mountable in a side-by-side, closely interfitting disposition around said base to provide a continuous ground-engaging support cushion for said vehicle, individual said cushioning segments being elongated, tubular and open-ended to define at least one longitudinally extending aperture providing interior access to said hollow segment, said cushioning segments extending across said band-shaped base between segment ends at opposed sides of said band, when mounted on said base, and each comprising:

a) a longitudinal inner portion for engagement with said base;

b) a longitudinal outer segment portion carrying a ground-engaging surface;

c) longitudinal side faces extending between said inner and outer faces and providing resilient support for said outer segment portion;

d) a longitudinally extending raised tread carrying said ground-engaging surface, said raised tread being located on said outer segment portion between and spaced from said side faces and defining a tread-bearing portion of said hollow segment; and e) said at least one longitudinally extending ventilation aperture, said aperture being defined between said inner, outer and side portions and opening to atmosphere at each said segment end to cool said ground-engaging segment;

wherein said ventilation aperture has a cross-sectional shape including a raised portion extending beneath said raised tread along said tread whereby, under ground-engaging loads, said tread-bearing portion is movable inwardly toward said inner portion and said ground-engaging loads are directed laterally of said side walls toward neighboring segments and wherein said cushioning segments are configured to be interfittable around said at least one axis, with said segment, said tread and said ventilation aperture being shaped to extend laterally toward a neighboring segment, when mounted, said shaping being symmetrical about a midpoint of each segment's length.

2. A ground-engaging segment according to claim 1 wherein said hollow segment has an interior cavity and said ventilation aperture is dimensioned to provide access to said interior cavity to fit mounting hardware.

3. A ground engaging means according to claim 2 wherein said raised portions are in a circumferentially spaced relationship one with another and grooves are defined between said raised portions.

4. A ground engaging means according to claim 2 wherein said end of each first central section remote from said lateral sections converges to a point.

5. A ground engaging means according to claim 1 wherein each raised portion includes a second central section extending from said V formation in a direction opposite to said first central section and wherein each second central section remote from said lateral sections defines a tail formation having a recess.

6. A ground-engaging segment according to claim 2 having mounting apertures extending through said longitudinal inner portion, in combination with mounting hardware comprising a clamping plate insertable within said interior cavity and fixing means for said clamping plate to extend through said mounting apertures and secure said segment to said base.

7. A ground-engaging segment according to claim 1 wherein said segment, said tread and said ventilation aperture are V-shaped with a peak centrally disposed with regard to said midpoint of each segment's length when viewed in a direction transverse to said at least one axis.

8. A ground-engaging segment according to claim 7 wherein said ventilation aperture cross-sectional shape has side regions cooperating one with each said longitudinal side face to define a side wall having a reduced thickness zone of deformation under load, and said ventilation aperture is dimensioned to provide access into said hollow segment.

9. A ground-engaging segment according to claim 7 wherein said treads provide a rolling ground-engaging surface and wherein said V-shaped treads each have a symmetrically disposed nose-like portion extending away from said peak toward a neighboring element to increase the continuity of said rolling ground-engaging surface.

10. A ground-engaging segment according to claim 7 having rebates along each side of said tread, adjacent rebates of neighboring treads cooperating to provide grooves, said grooves enhancing traction in soft ground.

11. A ground-engaging segment according to claim 10 wherein said rebates define corners with said ground-engaging surface carried by said tread and said tread and ground-engaging surface extend laterally of said segment length around said at least one axis to provide a non-deforming, load-bearing support structure during ground engagement.

12. A ground-engaging segment according to claim 11 wherein said side faces are flat and meet said inner portion at inner corners and wherein said inner portion has an inner surface between said corners, said inner surface being shaped to conform to said base.

13. A ground-engaging segment according to claim 12 wherein said ventilation aperture or apertures have, viewed endwise, a cross-sectional aperture with a shape extending along said inner portion, along said side faces to define side walls and between said side walls to define a raised central portion.

14. A ground-engaging segment according to claim 13 wherein said raised central portion is a V-shaped peak and said outer segment portion of said ground-engaging segment also has a V-shaped configuration and is urged to spread under ground-engaging loads to urge said sidewalls apart.

15. A ground-engaging segment according to claim 14 wherein said side faces are flat and meet said outer segment portion at outer corners.

16. A ground-engaging segment according to claim 7, wherein said raised portion comprises a first central section and a pair of lateral sections each extending outwardly from said first central section toward said ends of said body, said lateral sections defining a V formation and said first central section extending from said V formation in said direction away from said outer ends of said lateral sections and towards said adjacent longitudinal side of said body.

17. A ground engaging segment according to claim 16 wherein said end of said central section remote from said lateral sections converges to a point.

18. A ground engaging segment according to claim 16 wherein said raised portion includes a second central section extending from said V formation in a direction opposite to said first central section and wherein said end of each second central section remote from said lateral sections defines a tail formation having a recess.

19. A ground engaging segment according to claim 16 wherein said body is configured in a V formation and wherein said V formation defined by said body generally corresponds to said V formation defined by said lateral sections.

20. A ground engaging segment according to claim 19 wherein the V formation defined by said body generally corresponds to the V formation defined by said lateral sections.

21. A hollow, resilient, integral, ground-engaging, cushioning segment for a wheel or endless track for a vehicle, said wheel or endless track having a band-shaped base cyclically movable around at least one axis, multiple said cushioning segments being mountable in a side-by-side, closely interfitting disposition around said base to provide a continuous ground-engaging support cushion for said vehicle, individual said cushioning segments being elongated, tubular and open-ended to define at least one longitudinally extending aperture providing interior access to said hollow segment, extending across said band-shaped base between segment ends at opposed sides of said band, when mounted on said base, and comprising:

a) a longitudinal inner portion for engagement with said base;

b) a longitudinal outer segment portion carrying a ground-engaging surface;

c) longitudinal flat side faces extending between said inner and outer faces and providing resilient support for said outer segment portion, said side faces meeting said inner and outer faces at inner and outer corners respectively, said inner portion having an inner surface between said corners, said inner surface being shaped to conform to said base;

d) a longitudinally extending raised tread carrying said ground-engaging surface, said raised tread being located on said outer segment portion between and spaced from said side faces and defining a tread-bearing portion of said hollow segment; and e) said at least one longitudinally extending ventilation aperture, said aperture being defined between said inner, outer and side portions and opening to atmosphere at each said segment end to cool said ground-engaging segment said ventilation aperture or apertures having, when viewed endwise of said cushioning segment, a cross-sectional aperture shape extending along said inner portion, along said side faces to define side walls and between said side walls to define a raised aperture portion extending beneath said raised tread along said tread; wherein said segment, said tread and said ventilation aperture are symmetrically V-shaped with a peak centrally disposed with regard to a midpoint of each segment's length when viewed in a direction transverse to said at least one axis, said V shaping extending laterally toward a neighboring segment, when said segments are mounted; and wherein said cushioning segments are configured to be interfittable around said at least one axis; whereby, under ground-engaging loads, said tread-bearing portion is movable inwardly toward said inner portion and said ground-engaging loads are directed laterally of said side walls toward neighboring segments.

* * * * *